United States Patent Office 3,300,387
Patented Jan. 24, 1967

3,300,387
PRESSED POWDER ANTIPERSPIRANT AND
METHOD OF PREPARATION
Richard L. Kole, Milwaukee, Wis., assignor to Kolmar Laboratories, Inc., Milwaukee, Wis., a corporation of Delaware
No Drawing. Filed Oct. 2, 1962, Ser. No. 227,726
8 Claims. (Cl. 167—90)

This invention relates to topically applied products for human use containing a hygroscopic active ingredient and to a method of making the same.

Antiperspirant products which are used to inhibit perspiration are generally sold in the form of aqueous sprays or roll-ons, gel sticks, creams and the like. It has been proposed to provide antiperspirant preparations in dry, loose powder form. However, loose powder antiperspirants are messy to use and have the disadvantage that the loose powder dusts. Also the antiperspirant particles become suspended into the air and may cause irritation of the nasal membranes or eyes.

The present invention is directed to a pressed powder cosmetic or pharmaceutical product containing a hygroscopic active ingredient and method of making the same. More specifically, finely divided particles of the active ingredient, such as an antiperspirant, are coated with a water soluble substantially non-hygroscopic, wax-like material and the coated particles may be mixed with an inert powder base or carrier, if desired, and formed into a pressed powder cosmetic or pharmaceutical product.

The wax-like coating on the particles of the active material provides a decreased rate of moisture absorption. The absorption of water causes the pressed product to crack and break up, so the invention results in a substantial increase in the shelf life and useful life of the product.

The product may be rubbed directly onto the skin, but preferably is applied by rubbing a puff over the pressed compact to cause the product to adhere thereto, then rubbing the puff against the skin to deposit material thereon. On application of the product to the skin, the body moisture will tend to dissolve the water soluble wax-like coating on the anti-perspirant particles with the result that the active antiperspirant is released to inhibit further perspiration.

As the particles of the antiperspirant are substantially coated with the wax-like material, dusting of the antiperspirant will be substantially reduced or eliminated with the result that nasal or eye irritation which may accompany loose powder antiperspirant products will be eliminated.

The active ingredient to be employed in the composition of the invention may be any active hygroscopic material including antiperspirants, such as aluminum chlorohydrate, sodium aluminum lactate complex, sodium zirconium lactate complex, aluminum sulfate or the like. The active ingredient is in the form of finely divided particles with the size of the particles being sufficiently small to provide the product with an acceptable cosmetic texture. Generally, the particle size is such that 90% of the particles will pass through a 325 mesh screen. While the pressed powder products can be prepared using larger sized particles, the larger particles provide a rather coarse or rough texture which is not particularly acceptable to the consumer.

It is desirable that the moisture content of the finely divided antiperspirant be as low as practicable before applying the wax-like coating thereto, so as to provide an extended shelf life. The antiperspirant material may be dried in any suitable manner as by heating at an elevated temperature for a period of time sufficient to remove the excess water. In some instances the elimination of water may be concomitant with the coating operation. In the case of aluminum chlorohydrate, heating at a temperature of about 135° C. for three hours will normally reduce the moisture content to a value well below 2% by weight, and generally it is preferred to keep the water content to about one half percent.

The term "wax-like material" as used in the specification and claims is intended to cover materials which are either liquids or solids at room temperature. The wax-like material must be water soluble or water dispersible at human body temperature so it will be disintegrated by body perspiration and release the antiperspirant, and in addition, it should be soluble in a non-aqueous solvent so that it can be applied to the hygroscopic material in the form of a non-aqueous solution. Preferably the wax-like material has pronounced dispersing properties so as to provide a high degree of uniformity in coating.

Examples of wax-like materials which can be used as the coating are polyethylene glycols having an average molecular weight in the range of 1,000 to 6,000, such as Polyglycol 1000 from Dow Chemical Co., Carbowax 1500 and Carbowax 4000 sold by the Carbide and Carbon Chemical Company; polypropylene glycols having an average molecular weight in the range of 140 to 600, as illustrated by polypropylene glycol 150 and polypropylene glycol 425 sold by Carbide and Carbon Chemical Company; methoxy polyethylene glycols having an average molecular weight in the range of 350 to 750, as illustrated by Carbowax methoxypolyethylene glycol 350 and Carbowax methoxy polyethylene glycol 550 sold by Carbide and Carbon Chemical Company ethoxylated fatty acids and alcohols containing from 8 to 20 carbon atoms, such as polyoxyethylene stearate, polyoxyethylene lauryl alcohol and the like; fatty acid esters of polyalcohols where the fatty acid contains from 8 to 20 carbon atoms, such as sorbitan monostearate, sorbitan trioleate, glycerol monostearate, ethylene glycol monolaurate, propylene glycol monostearate, and the like; ethoxylated lanolin; and lanolin extracts or fractions.

The coating preferably is carried out by dissolving the wax-like material in a non-aqueous solvent, mixing in the anti-perspirant particles, and then evaporating the solvent. To prepare the solution, the wax-like material is initially added to a sufficient quantity of the solvent to dissolve the wax-like material. Heat can be applied to accelerate the solution of the wax-like material. The powdered anti-perspirant is then added slowly to the solution with constant agitation to prevent the formation of lumps or clumps. The addition of the anti-perspirant material can be carried on at room temperature. After the anti-perspirant particles have been thoroughly mixed into the solution, the solvent is evaporated by any convenient means, preferably with agitation so as to produce a particulate mass. For example, the mixing can continue until solvent is evaporated, or mixture can be poured into shallow pans and air passed over the pans to accelerate evaporation, or spray drying can be employed.

After evaporation of the solvent, the anti-perspirant particles are substantially coated with the wax-like material.

As the relative proportions of the wax-like material and the anti-perspirant can vary within wide limits, the coating on the particles may not be continuous. In some cases the individual coated particles may tend to clump together and it may then be necessary to grind the composition to break up the clumps into the individual coated particles. The solvent should be substantially anhydrous, volatile and should not dissolve the anti-perspirant. Examples of solvents which can be employed are isopropyl alcohol, ethyl alcohol, methyl alcohol, dichloroethyl ether, trichloroethylene, ethyl acetate, dimethyl phthalate, toluene, and the like.

The coating comprises about 1 to 95% by weight of the coated active ingredient and preferably is about 5 to 15% by weight. The proportion of coating used in any particular case may be varied, and is dependent on the nature of the final cosmetic or pharmaceutical product and the amount of the active ingredient desired in the final product.

The coated anti-perspirant particles subsequently may be incorporated in a dry, pressed powder cosmetic or pharmaceutical product, such as a cake or stick. Generally, the pressed powder products have the following range of ingredients stated in percent by weight:

| | Percent |
|---|---|
| Coated particles of antiperspirant | 5 to 75 |
| Powder base | 20 to 95 |
| Binder | 0.5 to 10 |

To provide effective anti-perspirant properties, the pressed powder product should contain at least 5% by weight of the anti-perspirant. The upper operative limit of the anti-perspirant may be as high as 75% by weight of product, but from an economic standpoint the upper limit is generally about 25 to 50%.

In some cases where a high percentage of the wax-like material is used as the coating for the antiperspirant, the binder can be eliminated and the wax-like material will serve to bind the ingredients together.

The powder base to be used in the pressed powder product can be any conventional non-hygroscopic powder commonly used in cosmetic or pharmaceutical products. More specifically, and by way of example, the powder may be selected from materials such as talc; magnesium carbonate; magnesium silicate; calcium carbonate; starches, such as rice starch or cornstarch; clay, such as kaolin or bentonite; powdered stearates, such as lithium stearate, zinc stearate and magnesium stearate; and the like.

The binder to be employed in the pressed powder product can be any binder commonly used in cosmetic or pharmaceutical articles, and preferably one in which the wax-like coating is not highly soluble. More specifically, the binder may be selected from materials such as mineral oil; vegetable oils, such as castor oil; lanolin; lanolin absorption bases; petroleum; isopropyl esters, such as isopropyl myristate and isopropyl palmitate; and the like.

In addition, it is often desirable to include a small amount, in the range of 0.1 to 10.0% by weight of the pressed powder cake, of a bactericide such as p-chloro-m-xylenol; 2,2' thio bis (4,6 dichlorophenol); bis (3,5,6-trichloro-2-hydroxyphenyl) methane; or the like to reduce odor forming bacteria on the skin. Similarly from 0.1 to 10.0% by weight of an antibiotic, such as neomycin sulfate or tyrothricin, can be incorporated in the product.

It may also be desirable to include a small amount of a skin healing agent in the pressed powder formulation. The skin healing agent can be used in an amount of 0.05 to 10.0% by weight of the product. Examples of such skin healing agents are aluminum chlorhydroxy allantoinate or aluminum dihydroxy alantionate. The cake can be colored if desired by adding suitable organic or inorganic pigments.

The ingredients of the pressed powder composition are mixed together at room temperature with as little mixing as possible. If too much agitation is used, heat may be generated which would adversely affect the coating on the anti-perspirant particles. After the ingredients have been mixed, they are then pressed in the desired form with a pressure in the range of 200 to 1200 pounds per square inch generally being employed.

A specific example of the preparation of an anti-perspirant pressed powder cake made in accordance with the invention is as follows:

100 grams of Carbowax 1500 was heated until melted and then 650 grams of isopropyl alcohol were added to the melted Carbowax 1500 and blended in with a Lightning mixer. When the solution was complete, 2000 grams of the impalpable grade of aluminum chlorohydroxide (about 250 mesh) having a water content of about 2% was added slowly to the solution with continual stirring until the solution became a smooth, homogeneous mixture.

The mixture was then poured into a shallow pan for evaporation of the alcohol. After drying away the alcohol, the coated aluminum chlorohydroxide was put into a mixer and mixed for one hour to break up the coated particles into smaller sized particles.

230 grams of talc, 2.5 grams of aluminum chlorhydroxy allantoinate, 5 grams of p-chloro-m-xylenol were added to 247.5 grams of the coated aluminum chlorohydrate particles and mixed for 10 minutes. Following this, 12.5 grams of mineral oil and 2.5 grams of perfume were added to the mixture and again mixed for 10 minutes. The resulting mixture was then passed through a grinder and subsequently introduced into pans and pressed at a pressure of approximately 400 pounds per square inch into cake of about ¾ ounce each.

The resulting pressed powder cake has a white color, and a smooth, fine texture.

To illustrate the effectiveness of the pressed powder cakes of the invention in resisting cracking under extreme humidity condition, sample cakes were prepared incorporating the coated anti-perspirant particles and sample cakes were also prepared using uncoated anti-perspirant particles. The samples had the following composition in parts by weight:

*Sample 1*

| | |
|---|---|
| Uncoated aluminum chlorhydrate (water content .96 part) | 48.34 |
| Aluminum chlorhydroxy allantoinate | 0.47 |
| Talc | 47.47 |
| Bactericide* | 0.93 |
| Mineral oil | 2.32 |
| Perfume | 0.47 |

*p-Chloro-m-xylenol.

*Sample 2*

| | |
|---|---|
| Coated aluminum chlorohydrate (45.6 parts aluminum chlorohydrate—water content .91 part—and 2.74 parts Carbowax 1500) | 48.34 |
| Aluminum chlorhydroxy allantoinate | 0.47 |
| Talc | 47.47 |
| Bactericide* | 0.93 |
| Mineral oil | 2.32 |
| Perfume | 0.47 |

*p-Chloro-m-xylenol.

Samples No. 1 and 2 were both placed in a humidity chamber having a relative humidity of 100% and a temperature of 38° C. Sample No. 1 containing the uncoated aluminum chlorohydrate cracked in 27 hours, while Sample No. 2 containing the coated aluminum chlorohydrate cracked after 175 hours. This test illustrates the substantial improvement in the resistance to cracking caused by moisture absorption brought about by the invention.

Various modes of carrying out the invention are contemplated as being within the scope of the following claims particularly pointing out and distinctly claiming the subject matter which is regarded as the invention.

I claim:

1. A method of preparing a topically applied product for human use, comprising the steps of dissolving a water disintegratable, organic, wax-like material in a non-aqueous volatile solvent for said material to provide a treating solution, said wax-like material being water disintegratable at human body temperature, thoroughly mixing finely divided particles of a hygroscopic antiperspirant with the solution, evaporating the solvent to provide a coating of the wax-like material on said particles, and incorporating said coated particles in a dry powdery base to provide a topically applied product.

2. A method of preparing a topically applied product for human use, comprising the steps of dissolving an organic, water soluble wax-like material in a substantially anhydrous evaporable solvent for said material to provide a treating solution, said wax-like material being water soluble at human body temperature, adjusting the moisture content of finely divided particles of a hygroscopic antiperspirant to a value less than 2% by weight, mixing said particles with the solution, evaporating the solution to provide a coating of the water soluble wax-like material on said particles, and incorporating said coated particles with a powdery dry base and a binder to provide a topically applied product.

3. An active antiperspirant material for use in a dry antiperspirant product, comprising a plurality of finely divided particles of a hygroscopic antiperspirant having a coating of an organic wax-like material thereon, said wax-like material being water disintegratable at human body temperature, said coating being disintegrated by body moisture when the product is applied to the body to thereby release said antiperspirant.

4. A pressed powder antiperspirant product, consisting essentially of 5 to 75% by weight of finely divided particles of a hygroscopic antiperspirant material coated with a water soluble, organic, wax-like material, said wax-like material being water soluble at human body temperature and comprising from 1 to 95% by weight of the coated particles, 20 to 95% dry powder base, and 0.5 to 10% of a binder.

5. The product of claim 4 which also includes from 0.05 to 10% of a material selected from the group consisting of aluminum chlorhydroxy allantoinate and aluminum dihydroxy allantoinate.

6. The product of claim 4 and including from 0.1 to 10% of a bactericide.

7. An active antiperspirant material for use in a dry antiperspirant product, comprising a plurality of finely divided particles of an antiperspirant selected from the group consisting of aluminum chlorhydrate, sodium aluminum lactate, sodium zirconium lactate, aluminum sulfate, and mixtures thereof, and an organic, water disintegratable wax-like material coating said particles, said material being water disintegratable at human body temperature and being disintegrated by body perspiration when the product is applied to the body to thereby release said antiperspirant.

8. A topically applied product for human use, comprising a dry pressed powder cosmetic base having dispersed therein finely divided particles of a hygroscopic antiperspirant coated with a water soluble wax-like material selected from the group consisting of polyethylene glycols having an average molecular weight in the range of 1000 to 6000; polypropylene glycols having an average molecular weight in the range of 140 to 600; methoxy propylene glycols having an average molecular weight in the range of 350 to 750; lanolin extracts; ethoxylated lanolin; fatty acid esters of polyalcohols where the fatty acid group contains from 8 to 20 carbon atoms; ethoxylated fatty acids with the fatty acid containing from 8 to 20 carbon atoms; and ethoxylated fatty alcohols with the fatty alcohols having from 8 to 20 carbon atoms.

References Cited by the Examiner

UNITED STATES PATENTS

| | | | |
|---|---|---|---|
| 1,984,669 | 12/1934 | Taub | 167—90 |
| 2,087,161 | 7/1937 | Moore | 167—90 |
| 2,732,327 | 1/1956 | Teller | 167—90 |
| 2,761,867 | 9/1956 | Mecca | 167—90 |
| 2,857,315 | 10/1958 | Teller | 167—90 |
| 3,082,154 | 3/1963 | Allan | 117—100 |

OTHER REFERENCES

Sagarin, Cosmetics, Science and Technology, Interscience Publishers, 1957, pp. 727, 728, 722, and 730.

SAM ROSEN, *Primary Examiner.*

LEWIS GOTTS, JULIAN S. LEVITT, *Examiners.*

E. FRANK, VERA C. CLARKE, *Assistant Examiners.*